May 4, 1937. A. J. MATTER 2,079,575
STRUCTURAL JOINT
Filed May 6, 1935
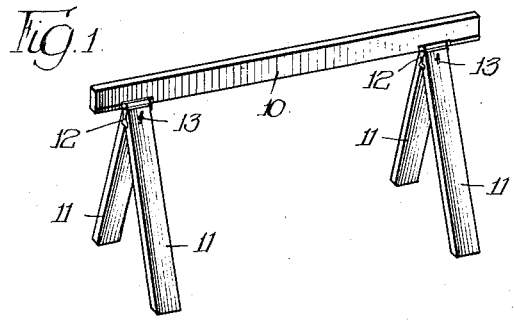
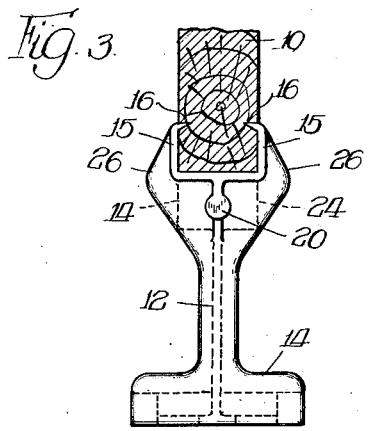
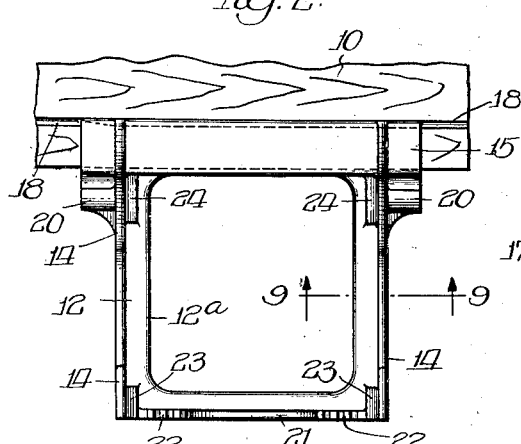
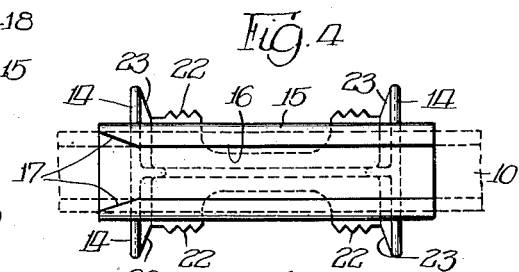
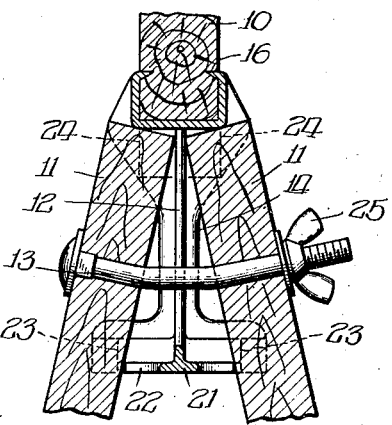
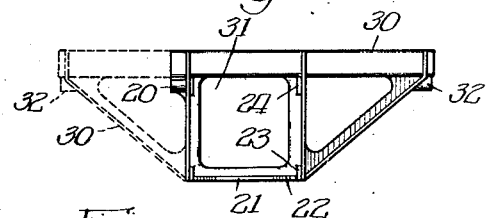
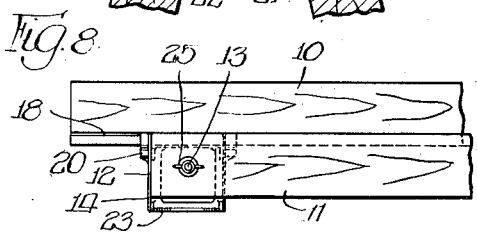
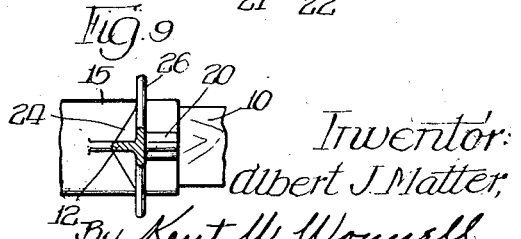
Inventor:
Albert J. Matter,
By Kent M. Womwell
Atty.

Patented May 4, 1937

2,079,575

UNITED STATES PATENT OFFICE 2,079,575

STRUCTURAL JOINT

Albert J. Matter, Park Ridge, Ill., assignor to Crane Packing Company, Chicago, Ill., a corporation of Illinois Application May 6, 1935, Serial No. 19,953

15 Claims. (Cl. 304—5)

This invention relates in general to a joint for wooden structures and is more particularly described in connection with a supporting horse or trestle although it may have a more general application wherever used.

An important object of the invention is in the provision of a lightweight metallic joint structure which may be applied to and removed from the articles which it connects so that the parts may be rapidly assembled for use and disconnected for packing and storage.

A further object of the invention is in the provision of a metallic joint member of this kind which is light in weight, compact in form, and yet strong and rigid for the services intended.

A still further object of the invention is in the provision of a metallic joint member in which the beams are wedged tightly in place and held against endwise and lateral movement and at the same time bound together for supporting connection.

A still further object of the invention is in the provision of a metallic joint member which has a gripping engagement extending lengthwise of one or more of the beams which it connects.

Other objects of the invention are in the provision of beveled ends to the grippers; in providing a pounding lug or lugs; in extending the gripper edges in one or both directions from a main or intermediate portion; and in suitably proportioning the metallic joint member so that it will have a maximum of strength and a minimum of weight.

Other objects of the invention will be apparent from the specification and from the drawing in which, Fig. 1 is a perspective of a supporting horse or trestle embodying the invention;

Fig. 2 is a side elevation of a metal joint member as applied to a connecting beam;

Fig. 3 is a section of the structure shown in Fig. 2;

Fig. 4 is a top view of the metal joint member;

Fig. 5 is a bottom view of the metal joint member;

Fig. 6 is an end elevation partly in section, of one of the joints as shown in Fig. 1;

Fig. 7 illustrates a modification of the joint member;

Fig. 8 is a side elevation of a portion of a structure as shown in Fig. 1, in folded position; and Fig. 9 is a section taken on the line 9—9 of Fig. 2.

In providing a joint for beams, trestles and other structural purposes it is desirable that the metal connecting portion be both light and strong, easily assembled and disconnected, and that the connected parts are held tightly in place.

Referring more particularly to the drawing in which the invention is described as used in connection with a horse or trestle, a cross beam 10 is supported by legs 11 of stock size and material which are connected by a joint member 12 and a fastening bolt 13.

The joint member comprises a frame in which is a central opening 12a for decreasing the weight, flanged ends 14, a channeled portion 15 with inwardly extending pointed and gripping edges 16 which extend along the channel and have a beveled extremity 17 at one or both ends so that the fitting may be applied lengthwise to a beam 10 and forced thereon, the gripping edges making grooves 18 in the opposite sides of the member to which applied.

The channeled sections preferably overlap the flanged ends 14 and below the ends of the channel are projections or bosses 20 which may be used for pounding the fitting in place or removing it from a beam as by means of a hammer or another suitable implement, the bosses being provided for preventing defacement of or damage to the remainder of the fitting.

At the bottom of the fitting the web 21 is reduced between the flanges but adjacent the end flanges 14 are toothed projections 22 which run into the wedging surfaces 23 extending to the outer edges of the flanges 14 and at the top of the fitting just below the channel 15 are corresponding wedging surfaces 24 so that when a leg 11 is applied to either side of the fitting it will engage these wedging surfaces 23 and 24 and when pressed in place will be tightly confined thereby, and if the leg is of wood or similar material it will be correspondingly marred or defaced by means of the bolt 13 which is inserted through the ends of the legs for locking them in place by means of a winged nut 25 or other suitable binding means. The tooth edges 22 will also engage the inner sides of the legs at a distance from the ends so that corresponding notches or marks will be made in the legs when tightly clamped in position.

The extremities of the legs engage the under side of the channel 15, as shown more clearly in Fig. 6, to limit their endwise movement. The legs are spaced apart by their engagement with the central web of the fitting 12 and the angle of inclination of the legs is determined by the spread of the toothed web 22 as compared with the thickness of the web of the fitting at the top.

In order to strengthen the channel portions at the ends where they receive the greatest strain, there is an outwardly extending flange 26 at each side of the fitting which preferably conforms to the outer surface of the legs so that it produces no unsightly bulge or projection.

For certain joints it may be desirable to provide an angular extension 30 to a central fitting 31 which conforms in other respects to the fitting 12, or it may be desirable to provide such an angular extension on either or both sides thereof. With this construction the pounding boss 20 is omitted from that end of the central member 12 and a pounding boss 32 is provided at the outer end of the angular extension 30.

In collapsing this joint or trestle the parts may be entirely separated and the joint member 12 removed therefrom or the legs may be released from their clamping engagement by loosening the nut 25 on the bolt 13 to such an extent that the legs can be moved substantially parallel with the cross member or beam 10 and the nuts 25 then left loose or tightened to hold the legs in place. In this condition the parts may be packed or piled more compactly for shipping or storage than in a setup position, and may be set up more quickly by simply loosening the bolts 13, moving the legs to proper supporting position and tightening the bolts in place.

For greater strength and lightweight of material, the fitting 12 and any angular extensions thereof are preferably T-shaped in cross section as shown more clearly in Figs. 6 and 9, and the fittings are preferably made of malleable iron or any other suitable material which is strong and not easily broken.

I claim:

1. A metal joint member having a receiving trough with inwardly turned gripper edges applicable longitudinally to groove the opposite sides of a beam, a median web below the trough with opposite side portions to engage supports at an angle to the trough, the web having a large opening therein for a fastening bolt inserted also through the ends of such supports for clamping them against the side portions.

2. A metal joint member having an open channel with inwardly turned sharp gripper edges, a median web at the bottom of the channel and with strengthening flanges at the ends of the web adjacent the ends of the channel and with a thicker pounding boss forming a strengthening filet between the outer side of the flange and the end of the channel.

3. A metal joint member having an open channel with sharp gripper edges beveled at one end for application longitudinally to a beam, a supporting web extending below the channel having pounding bosses at the ends of the web adjacent the channel by means of which the fitting is applied to and removed from a beam.

4. A metal joint member having an open channel with an integral web extending from the under side thereof, outwardly diverging inclined wedging surfaces at opposite sides of the web close to the under side of the channel and at a distance therefrom, the wedging surfaces at a distance therefrom being spaced apart on opposite sides of the web so that supports applied laterally thereto will be increasingly gripped at the edges when pressed inwardly and inclined to the channel and engage the under side thereof and will be inclined to each other at their outer ends.

5. A structural joint member having a channeled portion with a web extending from the bottom and flanged ends, and inclined wedging portions at each side of the web adjacent the flanges for holding supporting members at the sides of the web and inclined to each other at the under side of the channel, and the outer edges of the web portion between the channel having gripper teeth for engaging the supporting members applied to the sides of the member.

6. A structural joint comprising a cross beam and supporting legs therefor, a joint member having a channed portion with inwardly turned sharp edges to grip a beam inserted longitudinally therein, and a web portion extending from the bottom of the channel with end flanges and inclined surfaces adjacent the flanges for engaging a support at each side of the member and the end of the support in contact with the under side of the channel portion, the web having an opening between the flanges, and a fastening bolt inserted through the ends of the supporting members and through the said opening for binding the supporting members tightly in place against the wedging surfaces and holding them at an angle to each other.

7. In a structural joint, a metal joint member having an open trough with inwardly turned gripper edges, a flanged web extending from the bottom of the channel and perforated centrally thereof for lightness, wedging surfaces adjacent the flanges below the channel and at the outer portion of the web, the outer portion of the web also having a cross connection between the flanges with outwardly toothed engaging portions, a beam applied longitudinally to the channel grooved and engaged by the gripper edges, leg supports applied at opposite sides of the web with their ends in contact with the under side of the channel portion, their edges against the wedging portions, and their sides in engagement with the tooth portions, and fastening means inserted through the ends of the legs and through the perforation of the joint member for binding the legs tightly in place against the wedging surfaces and in contact with the holding teeth.

8. A structural joint comprising a joint member having an open channel and an integral flanged web portion extending below the channel with a hollow interior and a marginal flanged edge, wedging surfaces at each side of the web adjacent the end flanges and projecting teeth in the outer flange of the web, a connecting beam inserted in the channel, supporting beams applied laterally to the sides of the web engaging the inclined surfaces at the edges, the ends of the side beams engaging the under side of the channel and the sides of the side beams engaging the teeth of the joint member, and a fastening bolt inserted through the ends of the side members and through the joint member for binding the ends of the supporting members tightly against the wedging surfaces and the teeth and for inclining them to each other at their outer ends.

9. A structure in accordance with claim 8 in which the fastening means engaging and binding the supporting members against the sides of the joint member is of sufficient length to release the supporting members and adjust them parallel to the supporting beam in the channel, and the opening in the joint member being sufficiently large to permit an adjustment of the fastening means therein for clamping the supporting members parallel with the supporting beam without entirely disengaging the fastening means.

10. A metal joint member having a beam receiving channel with inwardly turned gripper edges, a web extending from the bottom of the channel with a central perforated portion and with flanged ends, wedging means at the opposite sides of the web for holding a support with one end against the under side of the channel and the other at a diverging angle, and an extension of the channel and web structure beyond the main joint portion at the side thereof.

11. In a structure in accordance with claim 10, having gripper edges adapted to forcibly engage the opposite sides of a beam to which it is applied, the web adjacent the channel of the extension having a boss by means of which the member is applied to and removed from beam engaging position.

12. A metal joint comprising a channel having inwardly turned gripper edges, a flanged frame extending therefrom having a large central opening and a reinforced marginal rim, the outer flange having outwardly extending teeth on opposite sides of the web and wedging surfaces adjacent the teeth and the end flanges, other wedging surfaces adjacent the flanges at the under side of the channel whereby supports are applied laterally to the sides of the web engaging the under side of the channel, the wedging surfaces and the teeth, and the supports on opposite sides are inclined outwardly from each other at their outer ends.

13. The combination with a metal joint member having a channel with inwardly extending gripper edges, and a perforated flanged web extending from the bottom thereof, the web having teeth and wedging surfaces within the end flanges at each side thereof, a support applied to the outside of the member in engagement with the under side of the channel, the wedging surfaces and the teeth, a connecting beam grooved and engaged by the gripper edges when the joint member is applied thereto, and a fastening bolt inserted through supports at opposite sides of the joint member and permitting the disengagement of the support from the wedging surfaces and the teeth and a readjustment of the connected ends through the opening in the web without disconnecting the fastening bolt from the joint member or from the supports, whereby the supports may be adjusted and fastened in position parallel to the connecting beam which is engaged by the grippers, for compact folding and storage.

14. A metal joint member comprising a channel portion with inwardly turned sharp edges forming grippers to engage the opposite faces of a member inserted therebetween and having an integral supporting web below the channel portion with opposite side portions to engage supports applied laterally thereto and at an angle to each other below and in end contact with the outer side of the channel portion, and fastening means to engage the outer faces of supporting members and to hold them against the said web.

15. A metal joint member comprising a channel portion with inwardly turned sharp edges forming grippers applicable longitudinally to groove the opposite sides of a beam inserted therebetween, a median web below the channel portion with opposite engaging side portions having outwardly diverging wedging surfaces to engage the inner edges of supports applied laterally at an angle to the channel portion, and fastening means to engage the outer faces of supports and to press them against the said graduated wedging surfaces.

ALBERT J. MATTER.